(12) United States Patent
Benmoussa et al.

(10) Patent No.: US 9,169,002 B2
(45) Date of Patent: Oct. 27, 2015

(54) METHOD OF MANAGING A STEERING COMMAND FOR A STEERABLE PORTION OF AIRCRAFT LANDING GEAR

(71) Applicant: MESSIER-BUGATTI-DOWTY, Velizy-Villacoublay (FR)

(72) Inventors: Michael Benmoussa, Velizy-Villacoublay (FR); David Poiret, Velizy-Villacoublay (FR); Jerome Fraval, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 123 days.

(21) Appl. No.: 13/779,397

(22) Filed: Feb. 27, 2013

(65) Prior Publication Data

US 2014/0156113 A1    Jun. 5, 2014

(30) Foreign Application Priority Data

Feb. 6, 2012    (FR) ...................................... 12 51094

(51) Int. Cl.
*B64C 25/50*    (2006.01)
*B64C 19/00*    (2006.01)
*G05D 1/00*    (2006.01)

(52) U.S. Cl.
CPC ................. *B64C 19/00* (2013.01); *B64C 25/50* (2013.01); *G05D 1/0083* (2013.01)

(58) Field of Classification Search
CPC ....... B64C 25/50; B64C 19/00; G05D 1/0083
USPC .............. 701/3; 244/100, 102, 203; 180/6.28, 180/9.38, 12, 14.7, 204, 252, 253, 320, 410, 180/210, 211; 280/62
See application file for complete search history.

(56) References Cited

U.S. PATENT DOCUMENTS

| | | | |
|---|---|---|---|
| 6,722,610 B1* | 4/2004 | Rawdon et al. | 244/103 W |
| 6,732,979 B1* | 5/2004 | Kilner et al. | 244/236 |
| 2003/0125848 A1* | 7/2003 | Otake et al. | 701/3 |
| 2006/0125848 A1* | 6/2006 | Alcorn et al. | 345/629 |
| 2006/0186267 A1* | 8/2006 | Steiner et al. | 244/110 A |
| 2006/0214063 A1* | 9/2006 | Firuz et al. | 244/175 |
| 2008/0188998 A1* | 8/2008 | Venios et al. | 701/3 |
| 2009/0261197 A1* | 10/2009 | Cox et al. | 244/50 |

FOREIGN PATENT DOCUMENTS

| | | |
|---|---|---|
| EP | 2447155 A1 | 5/2012 |
| FR | 2924831 A1 | 6/2009 |
| WO | 2006/096446 A2 | 9/2006 |
| WO | 2010/150760 A1 | 12/2010 |

OTHER PUBLICATIONS

French Preliminary Search Report for FR 1251094 dated Sep. 28, 2012.

* cited by examiner

*Primary Examiner* — Stephen Holwerda
(74) *Attorney, Agent, or Firm* — Sughrue Mion, PLLC

(57) ABSTRACT

A method of managing a steering command for a steerable portion 3 of nose landing gear 2 of an aircraft 1. The method implements servo-control to servo-control of a steering actuator 6 to an angle position setpoint θset for the steerable portion 3. The servo-control includes calculating an error ε by subtracting a reference angle θest from the angle position setpoint θset. The reference angle θest is an angle determined by calculation as a function of a longitudinal speed Vlong and a yaw rate τ of the aircraft 1.

3 Claims, 2 Drawing Sheets

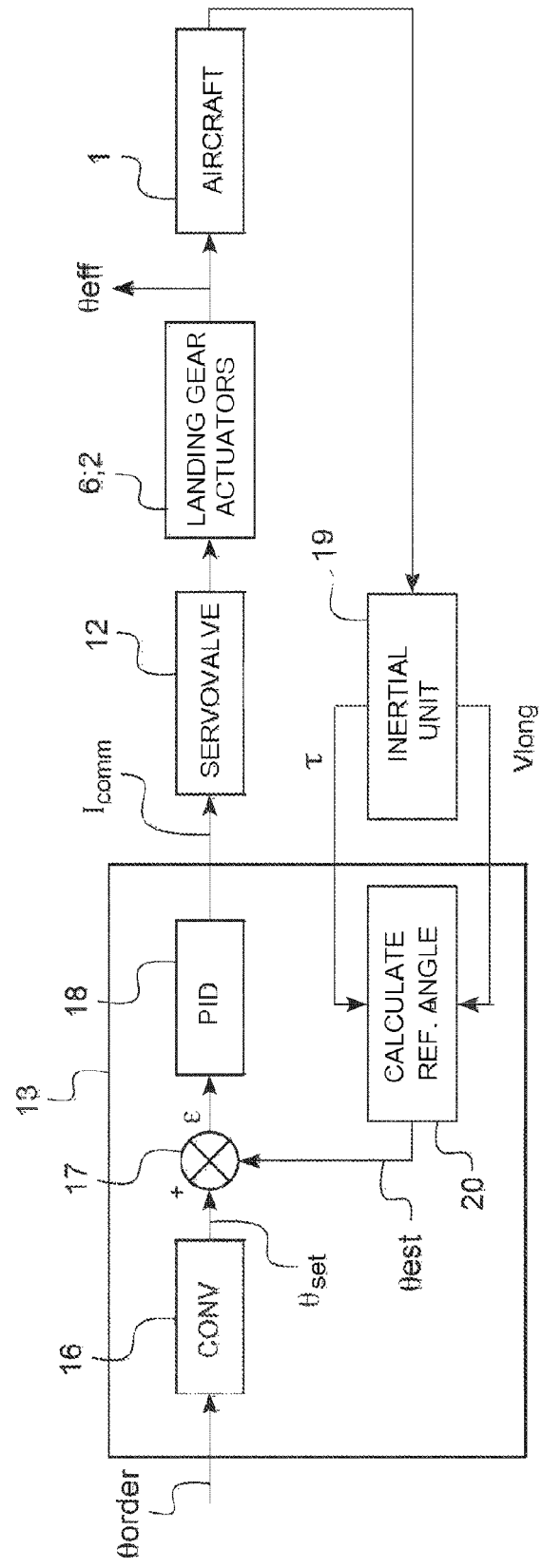

METHOD OF MANAGING A STEERING COMMAND FOR A STEERABLE PORTION OF AIRCRAFT LANDING GEAR

The invention relates to a method of managing a steering command for a steerable portion of aircraft landing gear.

BACKGROUND OF THE INVENTION

Most modern aircraft have nose landing gear situated under the nose of the fuselage of the aircraft. Generally, steering of the aircraft on the ground is controlled by controlling the steering of a steerable bottom portion of the nose landing gear that carries the wheels, with steering orders being generated for a steering actuator, e.g. an actuator with a rack or a rotary actuator co-operating with a toothed ring constrained to turn with the steerable bottom portion, or indeed a push-pull device.

The angular position of the steerable portion of the auxiliary landing gear is servo-controlled to a command order coming from the cockpit. This servo-control is performed in conventional manner by using a proportional integral derivative (PID) type controller which outputs a command current for delivery to the steering actuator.

The command order is generated by a pilot or a copilot operating a steering wheel specially provided for this purpose, or pedals, or both of those elements simultaneously. Sensors for sensing the angular position of the nose landing gear measure the angular position of the steerable portion in order to servo-control the command order. Those sensors are generally rotary variable differential transformer (RVDT) sensors, or potentiometer type sensors.

The use of such angle sensors for determining the steering angle of the aircraft makes steering control liable to measurement errors, e.g. as a result of tires that are not properly inflated, as a result of the landing gear being out of balance, or as a result of variations in the positioning of the sensors.

In addition, such angle sensors are situated on the nose landing gear in a zone that is particularly exposed, being subjected in particular to high levels of mechanical stress, to large temperature variations, and to high levels of moisture. The reliability of such sensors is degraded as a result of their position, which means they need to be replaced frequently.

OBJECT OF THE INVENTION

The invention seeks to provide a method of managing a steering command for a steerable portion of aircraft landing gear that enables the command to be made more accurate and more reliable.

SUMMARY OF THE INVENTION

In order to achieve this object, the invention provides a method of managing a steering command for a steerable portion of nose landing gear of an aircraft, the method implementing servo-control to servo-control a steering actuator to an angle position setpoint for the steerable portion, the servo-control including calculating an error by subtracting a reference angle from the angle position setpoint. According to the invention, the reference angle is an angle determined by calculation as a function of a longitudinal speed and a yaw rate of the aircraft.

This command management method does not require an angle sensor to be used in order to determine the reference angle. The reference angle is obtained from the longitudinal speed and from the yaw rate, e.g. as provided by an inertial unit. The steering command of the aircraft is thus managed directly on the basis of the characteristics of real movement of the aircraft, and no longer on an angle position measurement delivered by an angular measurement sensor that is subjected to numerous sources of error.

BRIEF DESCRIPTION OF THE DRAWINGS

The invention can be better understood in the light of the following description with reference to the figures of the accompanying drawings, in which:

FIG. 3 is a block diagram showing a particular implementation of the method of the invention for managing a steering command.

DETAILED DESCRIPTION OF THE INVENTION

Figure 1:
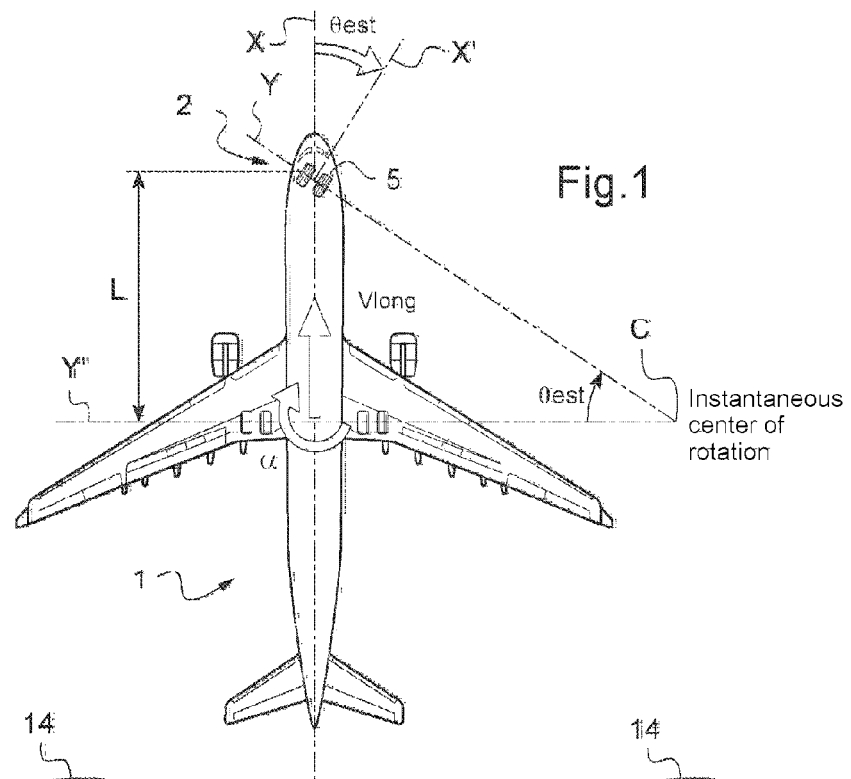
FIG. 1 is a diagrammatic plan view of an aircraft taxiing on the ground.
Figure 2:
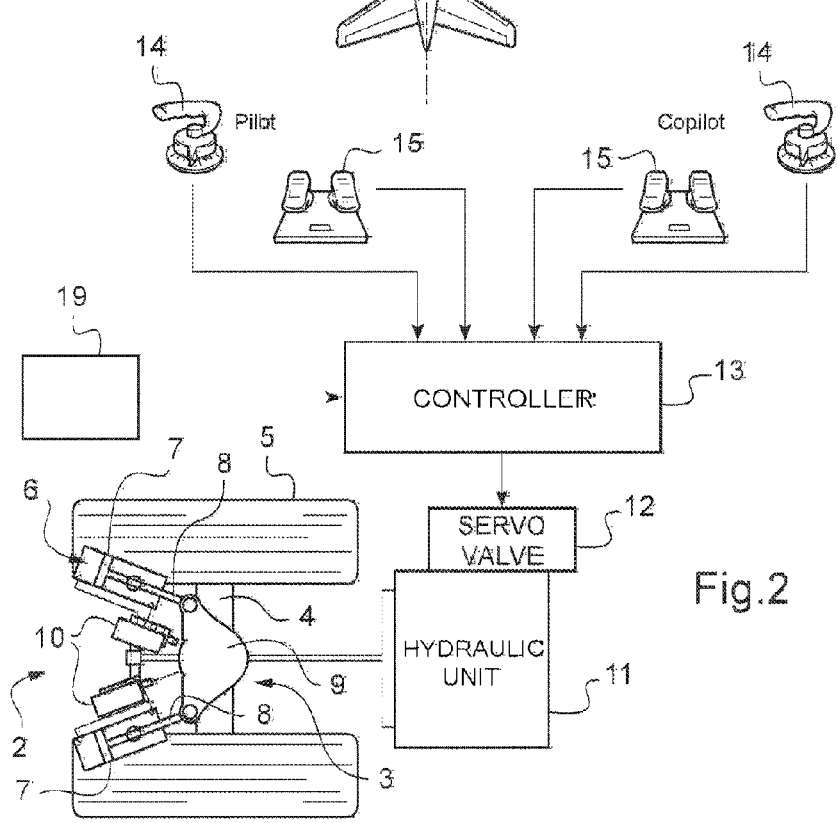
FIG. 2 is a diagram showing an architecture for a steering control system of an aircraft implementing a method of the invention for managing a steering command.

With reference to FIGS. 1 and 2, an aircraft 1 has nose landing gear 2 including a steerable bottom portion 3 having an axle 4 carrying two wheels 5.

In this example, the nose landing gear 2 has a push-pull type steering actuator comprising two actuators 6 with cylinders 7 pivotally mounted on the landing gear and rods 8 with their ends coupled to a collar 9 mounted to turn relative to the landing gear. The collar 9 is itself connected to the steerable bottom portion by a scissors linkage (not shown). Rotary valves 10 serve to connect the chambers of the actuators 6 to the pressure feed or return depending on their angular positions. The actuators 6 are connected via the rotary valves 10 to a hydraulic unit 11 that carries a servo-valve 12 that receives control current from a controller 13. All this is well known and is recalled merely by way of illustration.

In order to steer the steerable portion 3 of the nose landing gear 2, and thus the aircraft 1, the pilot and the copilot are each provided with a steering wheel 14 and pedals 15 enabling them to issue an angle order θorder (visible in FIG. 3) to the controller 13. The controller 13 then generates a command current Icomm. For this purpose, a converter 16 implemented in the controller 13 begins by transforming the angle order θorder into a setpoint angle θset for a servo-control. The servo-control includes means for calculating an error ε, which is performed by a subtracter 17 that subtracts an estimated steering angle θest of the steerable portion 3 of the nose landing gear 2 from the setpoint angle θset. Thereafter, a PID controller 18 acts on the error ε to generate a command current Icomm as a function of the error ε. The command current Icomm is then transmitted to the servo-valve 12. Depending on the command current Icomm, the servo-valve determines the rate at which hydraulic fluid is delivered to the actuators 6 via the hydraulic unit 11. The rods 8 of the actuators 6 then together serve to turn the steerable bottom portion 3 so as to orient it at an effective angle θeff.

In order to determine the estimated steering angle θest of the nose landing gear at a certain instant t, and thus in order to correct the setpoint angle θset, the management method of the invention makes use of a longitudinal speed value Vlong for the aircraft 1 and a yaw rate of the aircraft 1. This information is delivered by an inertial unit 19 of the aircraft 1.

The estimated steering angle θest can be seen in FIG. 1. The estimated steering angle θest is the angle between a longitudinal axis X of the aircraft and an axis X' perpendicular to an axis Y of the axle 4 of the nose landing gear 2. θest is also the angle, as seen at the instantaneous center of rotation C of the aircraft 1 at the instant t between the axis Y and a line Y' passing via the instantaneous center of rotation C and perpendicular to the longitudinal axis X. Thus, the line Y' passes via the axis of the axles of the main landing gear.

On the basis of the values of the longitudinal speed Vlong, of the yaw rate τ, and of a distance L between the line Y' and the nose landing gear 2 of the aircraft 1, a calculation function 20 implemented in the controller 13 delivers an estimate of the estimated angle θest of the nose landing gear 2, which estimate is obtained by using the following formula:

$$\theta est = \arctan\left(\frac{L \cdot \tau}{Vlong}\right)$$

The variables in this formula are expressed using the following units:
θest in degrees;
Vlong in meters per second;
L in meters; and
τ in degrees per second.

The estimated angle θest of the nose landing gear 2 is used in the management method to implement the servo-control shown in FIG. 3.

The above formula serves to deliver an estimate of θest for values of Vlong that are not zero. In practice, a minimum threshold is defined for the speed Vlong beneath which the angle θest is no longer calculated. When the speed Vlong is less than the minimum threshold, provision is also made to depressurize the steering actuator to avoid any untimely turning of the landing gear.

The invention is not limited to the particular embodiment described above, but on the contrary covers any variant coming within the ambit of the invention as defined by the claims.

Although a servo-control loop is described that includes a subtracter and a PID circuit, it is possible to implement any type of servo-control that includes at least calculating an error by subtracting a reference angle from a setpoint angle, the reference angle being determined as a function of the longitudinal speed and the yaw rate of the aircraft.

Although the invention is described above in application to a nose landing gear in which the steering actuator has hydraulic actuators powered by a servo-valve, the invention can equally well be applied to landing gear in which the steering actuator has one or more electromechanical actuators powered by a controller (or SMAC).

The invention claimed is:

1. A method of managing a steering command for a steerable portion (3) of nose landing gear (2) of an aircraft (1), using a servo-control, comprising:
    implementing servo-control of a steering actuator (6) to an angle position setpoint (θset) for the steerable portion (3),
    calculating an error (ε) by subtracting a reference angle (θest) from the angle position setpoint (θset), and
    determining the reference angle (θest) by calculation as a function of a longitudinal speed (Vlong) and a yaw rate (τ) of the aircraft (1), wherein the reference angle is determined using the formula:

$$\theta_{est} = \left(\frac{L \cdot \tau}{V_{long}}\right)$$

where Vlong is the longitudinal speed of the aircraft, τ is the yaw rate of the aircraft, and L is the distance between the main landing gear of the aircraft and the nose landing gear (2).

2. A method of managing a steering command according to claim 1, wherein the servo-control is performed by a servo-control loop including a proportional integral derivative (PID) controller (18) for generating a steering command (Icomm) for the actuator (6) as a function of the error (ε).

3. A method of managing a steering command according to claim 1, wherein the servo-control is implemented in a controller (13) arranged in the aircraft (1), the controller (13) delivering a command current (Icomm) to a command member (12) for delivering calibrated power to the steering actuator (6).

* * * * *